UNITED STATES PATENT OFFICE.

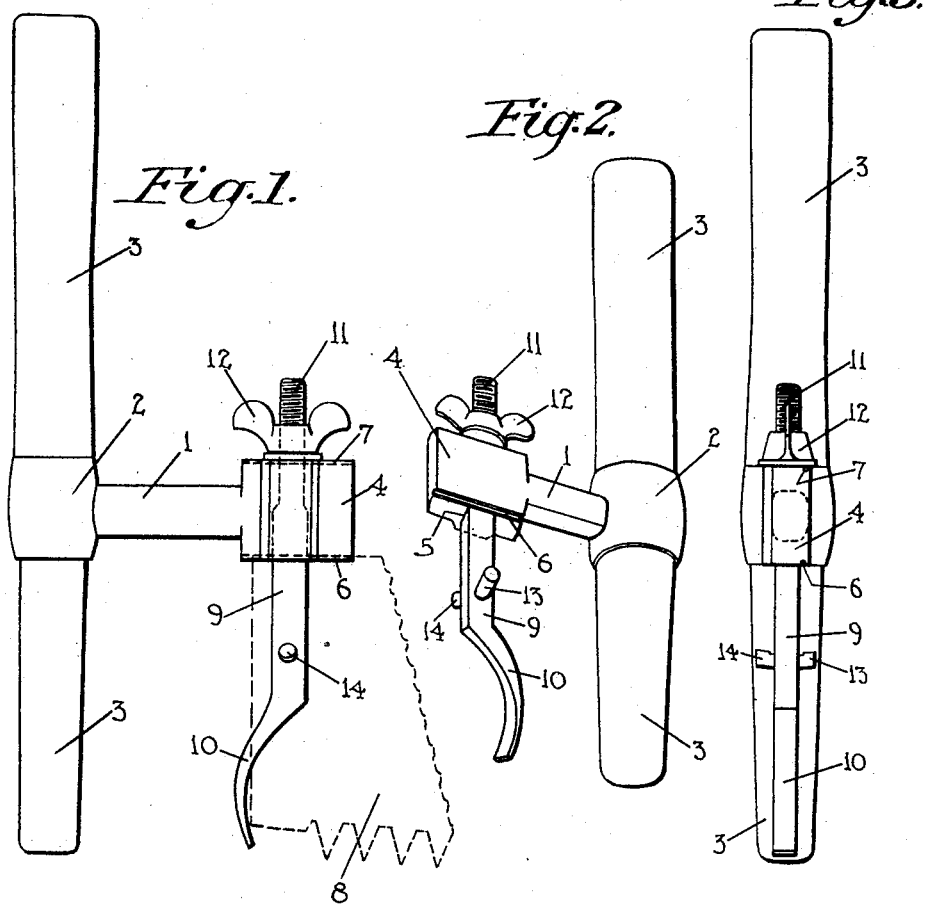

JOHN TORS, OF VANCOUVER, BRITISH COLUMBIA, CANADA, ASSIGNOR OF ONE-HALF TO ISAAC GUSTAFSON, OF VANCOUVER, BRITISH COLUMBIA, CANADA.

SAW-HANDLE.

1,400,249.      Specification of Letters Patent.      Patented Dec. 13, 1921.

Application filed February 14, 1921. Serial No. 444,792.

*To all whom it may concern:*

Be it known that I, JOHN TORS, a citizen of the United States, and a resident of the city of Vancouver, in the Province of British Columbia, Canada, have invented certain new and useful Improvements in Saw-Handles, of which the following is a specification.

My invention relates to improvements in saw handles, and the object of my invention is to provide a handle for saws, such as crosscut saws, which is simple and strong in construction, which provides for quick attachment of the saw to the handle, and which is reversible so that should the attaching means be broken another similar means is immediately available. A further object is to provide a guard which protects the hand from the saw teeth in case of slippage.

I attain these objects by the construction illustrated in the accompanying drawings in which—

Figure 1 is a side view of the device.

Fig. 2 is a perspective view.

Fig. 3 is an end view of Fig. 1.

Similar figures of reference indicate similar parts throughout the several views.

1 indicates a steel arm provided with an eyed end 2 into which the wooden gripping handle 3 is fitted, this handle projecting through the eye so that it may be gripped on either side of the same, as explained later. The opposite end of the arm 1 is enlarged to form a block 4 having a square hole 5 extending vertically through it and the upper and lower edges of the block are each provided with a longitudinal groove, 6 and 7 respectively, adapted to receive the edge of the saw blade, as shown in Fig. 1, the saw being indicated by the dotted lines and the numeral 8. In the square hole 5 a square bar 9 is slidably fitted one end of which is curved, as at 10, the back of which curved portion faces the handle 3 and the point of which lies approximately in the plane of the saw teeth as shown in Fig. 1, thus forming a guard past which the hand cannot slip against the saw teeth. The opposite end of the bar 9 is threaded, as at 11, and is provided with a thumb nut 12, while intermediate its length the bar is fitted with a rigid pin extending transversely through it forming two saw connecting pins 13 and 14, as shown, either of which is adapted to engage the usual hole formed adjacent the end of the saw.

The manner in which the device is used will be obvious. The handle is fitted to the saw blade by engaging the pin 13 in the saw hole just mentioned and placing the edge of the saw blade in the groove 6 and then tightening up the thumb nut 12. Should the pin 13 break the bar 9 is removed, and passed through the hole 5 from the opposite side, when the handle may be again fitted to the saw in the manner just described, the pin 14 being then available for connecting the saw to the handle, the wooden handle 3 of which is then gripped by the opposite end.

What I claim as my invention is:—

1. A saw handle comprising, a bar eyed at one end formed block shaped at its opposite end, said block being longitudinally grooved on its upper and lower edges and having a square aperture extending vertically through it, a bar slidably mounted in said aperture threaded on one end and provided with a nut, a rigid pin extending transversely through said bar so as to form a saw-connecting pin on each side of it, and a gripping handle fitted in said eye.

2. A saw handle comprising, a bar eyed at one end formed block shaped at its opposite end, said block being longitudinally grooved on its upper and lower edges and having a square aperture extending vertically through it, a bar slidably mounted in said aperture threaded on one end and provided with a nut and having its opposite end curved to form a guard disposed in front of the end of the saw, a rigid pin extending transversely through said bar so as to form a saw-connecting pin on each side of it, and a gripping handle fitted in said eye.

Dated at Vancouver, B. C., this 28th day of January, 1921.

JOHN TORS.